United States Patent [19]
Ueda et al.

[11] Patent Number: 5,295,213
[45] Date of Patent: Mar. 15, 1994

[54] OPTICAL CONNECTOR WITH ION EXCHANGE HARDENING

[75] Inventors: Tetsuji Ueda; Kazuhiko Kurata, both of Tokyo; Nobuo Funabiki; Masayo Hada, both of Shiga, all of Japan

[73] Assignees: NEC Corporation; Nippon Electric Glass Co., Ltd., both of Japan

[21] Appl. No.: 912,500

[22] Filed: Jul. 13, 1992

[30] Foreign Application Priority Data

Jul. 11, 1991 [JP] Japan .................. 3-171231

[51] Int. Cl.⁵ .............................................. G02B 6/26
[52] U.S. Cl. ........................................ 385/78; 385/75; 65/30.1
[58] Field of Search .................. 385/78, 85, 75, 66, 385/62, 60; 65/30.1, 30.13, 30.14

[56] References Cited

U.S. PATENT DOCUMENTS

| | | | |
|---|---|---|---|
| 4,273,432 | 6/1981 | Hogan | 65/30.14 |
| 4,455,160 | 6/1984 | Rittler | 65/30.14 |
| 4,483,700 | 10/1984 | Forker, Jr. et al. | 65/30.14 |
| 4,846,868 | 7/1989 | Aratani | 65/30.14 |
| 5,143,531 | 9/1992 | Kramer | 385/78 |

FOREIGN PATENT DOCUMENTS 1696063 8/1971 Fed. Rep. of Germany .
3310973 9/1984 Fed. Rep. of Germany .

OTHER PUBLICATIONS

Patent Abstracts of Japan, vol. 4, No. 110 (p. 22) 592), Aug. 8, 1980.
"Les Glaces Spheriques Mises En Forme Par Contrainte Chimique", Rev. int. Htes. et Refract. 1973, vol. 10, pp. 269-271.
Patent Abstracts of Japan, vol. 4, No. 110 (P-22)(592), Aug. 8, 1980 & JP-A-55 067 714 (Nippon Denshin Denwa).

Primary Examiner—Rodney B. Bovernick
Assistant Examiner—Stephen W. Barns
Attorney, Agent, or Firm—Ostrolenk, Faber, Gerb & Soffen

[57] ABSTRACT

A ferrule for an optical connector is of glass which is strengthened by ion-exchange.

5 Claims, 3 Drawing Sheets

OPTICAL CONNECTOR WITH ION EXCHANGE HARDENING

FIELD OF THE INVENTION

This invention relates to an optical connector for connecting optical fibers, and more particularly to, a solidified or strengthened structure of an optical connector ferrule.

BACKGROUND OF THE INVENTION

Optical connectors are optical devices which are used in all kinds of optical communication systems, optically applied equipments, etc., and are indispensable for the connection between optical fibers, and an optical fiber and a light emitting or receiving device.

One type of a conventional optical connector comprises a ferrule of a high mechanical strength such as ceramic for fixing an optical fiber exposed from a jacketed optical fiber on the center axis thereof, and a terminal metal member for fixing one end of the ferrule and supporting the jacketed optical fiber having the optical fiber exposed therefrom to be fixed by the ferrule.

Another type of a conventional optical connector comprises a glass capillary for fixing an optical fiber exposed from a jacketed optical fiber on the center axis thereof, and a terminal metal member for covering the whole outer surface of the glass capillary and supporting the jacketed optical fiber having the optical fiber exposed therefrom to be fixed by the capillary.

The ferrule or the glass capillary is polished on its outer surface to provide a predetermined outer surface precision by use of a whetstone rotated by a grinder, so that a precisely defined center axis is obtained.

In these optical connectors, an optical fiber is connected to an optical fiber or an optical device such as a photodiode, a laser device, etc. at mechanically and optically stable state.

However, the former optical connector has a disadvantage in that a material of the ferrule is limited to a high strength material such as ceramic.

Further, the latter optical connector has a disadvantage in that a manufacturing process is complicated and the manufacturing cost is high, because the glass capillary is totally covered by the terminal metal member.

Still further, the former and latter conventional optical connectors have a common disadvantage in that the productivity is low, because the center axis must be defined with high precision by the outer surface polishing.

SUMMARY OF THE INVENTION

Accordingly, it is an object of the invention to provide an optical connector using a glass ferrule in which the mechanical strength is hightened by compression stress.

It is a further object of the invention to provide an optical connector using a glass ferrule which is manufactured with low cost.

It is a still further object of the invention to provide an optical connector using a glass ferrule which is manufactured with high productivity.

According to the invention, an optical connector, comprises:

a glass ferrule having a center bore into which an optical fiber is inserted to be fixed;

wherein the glass ferrule is strengthened in mechanical strength by ion-exchange.

BRIEF DESCRIPTION OF THE DRAWINGS

The invention will be explained in more detail in conjunction with appended drawings; wherein.

DESCRIPTION OF THE PREFERRED EMBODIMENTS

Before explaining an optical connector of a preferred embodiment according to the invention, the aforementioned conventional optical connectors will be explained with reference to FIGS. 1 to 3.

Figure 1:
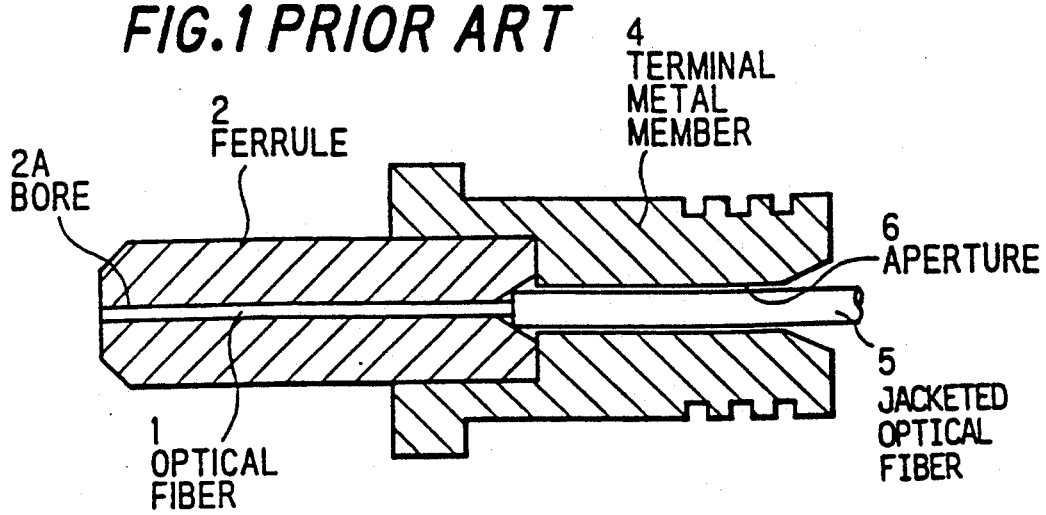
FIG. 1 is a cross-sectional view showing a first conventional optical connector.

FIG. 1 shows the first conventional optical connector which comprises a ceramic 2 having a bore 2A and a terminal metal member 4 having an aperture 6, wherein one end of the ferrule 2 is fixed by the terminal metal member 4. In this optical connector, a jacketed optical fiber 5 having an exposed optical fiber 1 is inserted to be fixed in the aperture 6 of the terminal metal member 4, and the optical fiber 1 is fixed in the bore 2A on the center axis of the ferrule 2.

Figure 2:
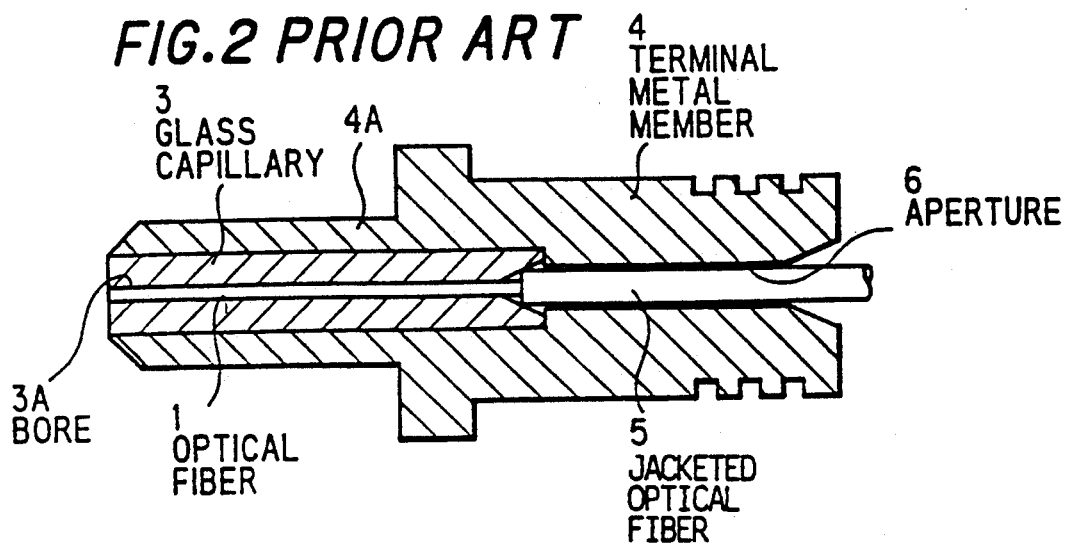
FIG. 2 is a cross-sectional view showing a second conventional optical connector.

FIG. 2 shows the second conventional optical connector which comprises a glass capillary 3 having a bore 3A and a terminal metal member 4 having an aperture 6, wherein the glass capillary 3 is covered on its whole outer surface by an extended portion 4A of the terminal metal member 4. In this optical connector, a jacketed optical fiber 5 having an exposed optical fiber 1 is inserted to be fixed in the aperture 6 of the terminal metal member 4, and the optical fiber 1 is fixed in the bore 3A on the center axis of the glass capillary 3.

Figure 3:
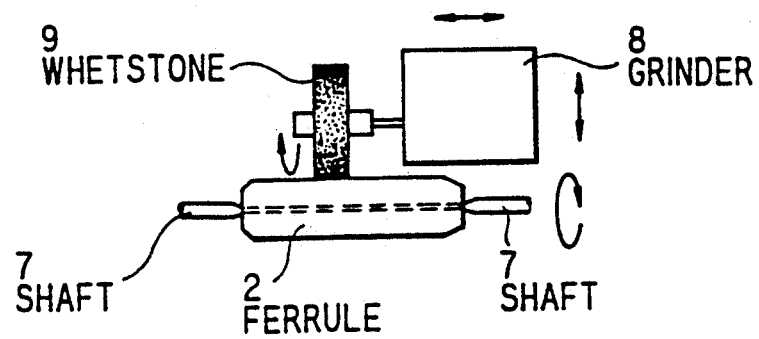
FIG. 3 is an explanatory view showing a grinder for polishing an outer surface of a ferrule or a glass capillary for an optical connector.

In FIG. 3, the ferrule 2 (FIG. 1) or the extended portion 4A of the terminal metal member 4 which is incorporating glass capillary 3 (FIG. 2) is supported by rotation shafts 7, and is polished on its outer surface by a whetstone 9 which is rotated by a grinder 8. The grinder 8 is controlled to move vertically as indicated by an arrow, so that the contact pressure of the whetstone 9 is controlled on the outer surface of the ferrule 2 (FIG. 1) or the extended portion 4A of the terminal metal member 4 which surrounds glass capillary 3 (FIG. 2).

In the first conventional optical connector as shown in FIG. 1, the ferrule 2 is required to be of high strength. Therefore, it is limited practically to a high strength material such as ceramic. On the other hand, if the ferrule 2 is made of glass, a glass ferrule of high precision is obtained by glass drawing method. However, cracks tend to occur on the glass ferrule, because glass is brittle. For this reason, a glass ferrule is not used practically.

Under this situation, a structure in which the glass capillary 3 is covered totally by the extended portion 4A of the terminal metal member 4 has been proposed. However, even this conventional optical connector has disadvantages as explained before.

Figure 4:
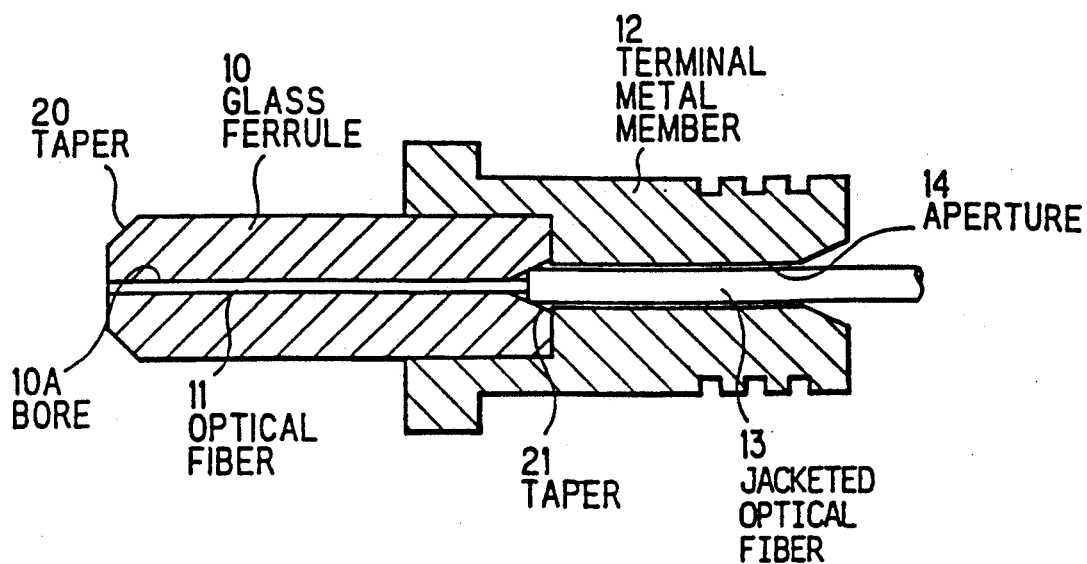
FIG. 4 is a cross-sectional view showing an optical connector of a preferred embodiment according to the invention.

Next, an optical connector of a preferred embodiment according to the invention will be described with reference to FIG. 4. The optical connector of FIG. 4 comprises a glass ferrule 10 having tapers 20 and 21 and a terminal metal member 12, wherein the glass ferrule 10 is strengthened mechanically by ion-exchange treatment. Exposed optical fiber 11 that extends from one end of jacketed optical fiber 14 is inserted into and fixed in a bore 10A. The latter is positioned on the center axis of the glass ferrule 10. The jacketed optical fiber 14 is inserted into and fixed in an aperture 14 of the terminal metal member 12.

Figure 5:
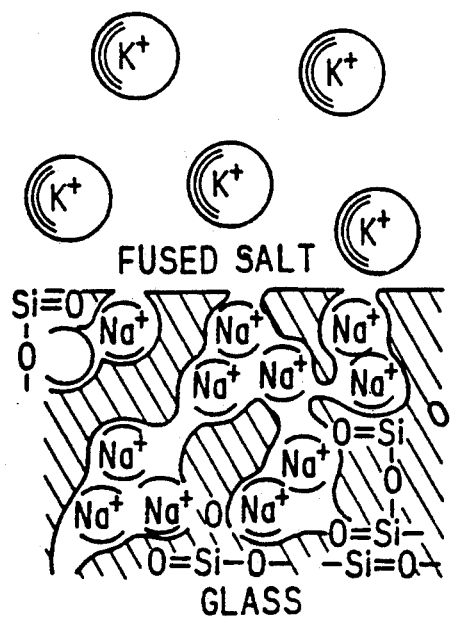
FIGS. 5 and 6 are explanatory views that explain the principle of ion-exchange which is used for mechanically strengthening a glass ferrule applied for the optical connector of the preferred embodiment.
Figure 6:
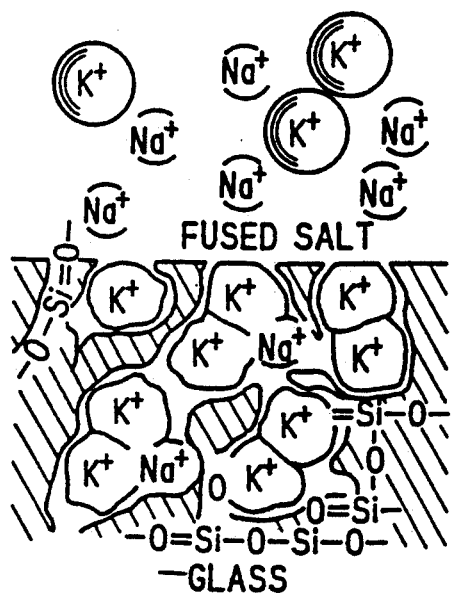

FIGS. 5 and 6 illustrate the principle of the ion-exchange treatment by which the glass ferrule 10 is strengthened mechanically. The state prior to of the glass ferrule material ion-exchange is shown in FIG. 5, while the state in which ion-exchange is completed is shown in FIG. 6.

The ion-exchange treatment is that alkali ions Na+ or Li+ are substituted by alkali ions K+ (for Na+, Li+) or Na+ (for Li+) having an ionic radius larger than the substituted ions, so that large compression stress occurs on the surface of glass material to increase its practical mechanical strength.

In accordance with the ion-exchange treatment, the features are obtained as set out below.

(a) strength of more than two times is obtained as compared with air cooling strengthening.
(b) no limitation is applied to configuration, thickness, etc.
(c) no deformation occurs so that high dimensional precision is retained.
(d) even small specimen which is difficult to be held is possible to be under this treatment.
(e) no tearing off occurs as in case of using a protective film.

Here, the ion-exchange treatment which is carried out in the preferred embodiment will be explained in more detail.

In the preferred embodiment, borosilicate glass ($Na_2O.B_2O.SiO_2$) having annealing point of 570° C. is used, and low temperature type ion-exchange which is defined in that the ion-exchange as shown in FIGS. 5 and 6 is carried out at a temperature lower than a glass transition point is adopted. On the other hand, high temperature type ion-exchange is defined to be carried out at a temperature ranging a glass transition point to a softening point. In the high temperature type ion-exchange, strength is largely increased. However, the deformation of glass tends to occurs. For this reason, the low temperature type ion-exchange is adopted in the preferred embodiment, as described above.

In this low temperature type ion-exchange, fused salt is prepared by heating and maintaining powder of pottassium nitrate ($KNO_3$) at a temperature of 400° C. Then, an original pipe of ferrules which is obtained by drawing a glass preform is dipped into the fused salt, and is held therein for several to ten and several hours, so that ions of Na+ and those of K+ are exchanged as shown in FIGS. 5 and 6. After this ion-exchange, the original pipe is pulled up from the fused salt, and is gradually cooled down to the room temperature. Then, the original pipe is cleaned by refined water, and, finally, is cut to have a length of the ferrule. This ion-exchange may be applied not to an original pipe, but to a ferrule.

This ion-exchange is expressed by the formula set out below.

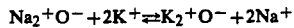

$$Na_2^+O^- + 2K^+ \rightleftharpoons K_2^+O^- + 2Na^+$$

Figure 7:
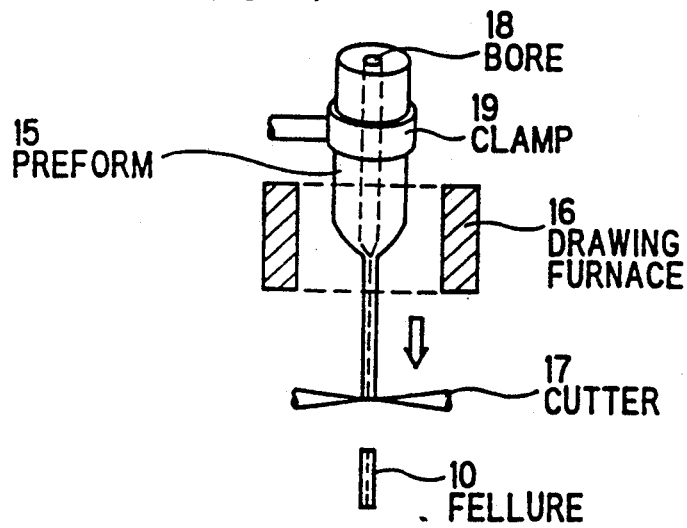
FIG. 7 is an explanatory view showing an apparatus for manufacturing a glass ferrule applied for the optical connector of the preferred embodiment.
Figure 8:
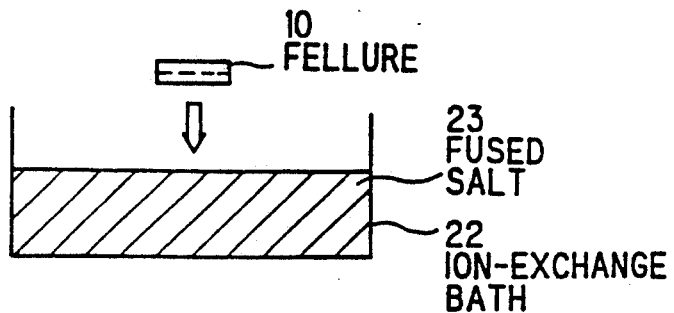
FIG. 8 is an explanatory view showing an ion-exchange apparatus for strengthening a glass ferrule applied for the optical connector of the preferred embodiment.

The ferrules are manufactured in an apparatus as shown in FIG. 7. A glass preform 15 is heated to be drawn by a drawing furnace 16, and the drawn glass preform is cut to have a length of a ferrule 10 by a cutter 17. In this manufacturing process, the glass preform 15 which is provided with an bore 18 is held by a clamp 19. The ferrule 10 is processed to have the taper 20 (FIG. 4) by polishing, and the taper 21 (FIG. 4) by etching. In this manufacturing process, defining the center axis of the ferrule 10 is realized only by glassdrawing.

The ferrule 10 is dipped into fused salt 23 in an ion-exchange bath 22. As explained before, the ferrule 10 is of borosilicate glass containing $Na_2O$ by 3 to 10%. In this fused salt bath 22, the aforementioned ion-exchange is carried out to provide a strengthened ferrule having strength of more than three times as compared with non ion-exchange processed ferrule.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. An optical connector, comprising:
   a glass ferrule having a center bore into which an optical fiber is inserted to be fixed;
   wherein said glass ferrule is constructed of a glass material containing alkali metal and has been subjected to a low temperature type ion-exchange treatment at a temperature of approximately 400° C. to increase its mechanical strength.

2. An optical connector, according to claim 1, further comprising;
   a terminal metal member for fixing said glass ferrule at one end thereof, said terminal metal member being provided with a center aperture into which a jacketed optical fiber is inserted to be fixed, said optical fiber being exposed from said jacketed optical fiber.

3. An optical connector, according to claim 2, wherein said ion-exchange treatment includes exchanging ions of Na+ in said glass ferrule with ions of K+ in fused salt.

4. An optical connector, according to claim 2, wherein:
   said low temperature type ion-exchange treatment utilizes a fused salt bath that is maintained at a temperature of approximately 400° C.

5. An optical connector comprising:
   a glass ferrule having a center bore into which an optical fiber is inserted to be fixed; and
   wherein said glass ferrule is strengthened in mechanical strength by ion-exchange, said glass ferrule being constructed of borosilicate glass and is shaped by processes of heating and drawing a glass preform, cutting a drawn glass preform, and dipping a cut ferrule into fused salt prepared by heating and maintaining powders of potassium nitrate at a temperature of approximately 400° C.

* * * * *